United States Patent
Pothiawala et al.

(10) Patent No.: US 12,443,918 B2
(45) Date of Patent: Oct. 14, 2025

(54) WEBSITE DATA SURFACING

(71) Applicant: Capital One Services, LLC, McLean, VA (US)

(72) Inventors: Ihab Pothiawala, Stamford, CT (US); Jude Anasta, Hudson, NY (US)

(73) Assignee: Capital One Services, LLC, McLean, VA (US)

( * ) Notice: Subject to any disclaimer, the term of this patent is extended or adjusted under 35 U.S.C. 154(b) by 370 days.

(21) Appl. No.: 18/108,921

(22) Filed: Feb. 13, 2023

(65) Prior Publication Data
US 2024/0273461 A1 Aug. 15, 2024

(51) Int. Cl.
*G06Q 10/087* (2023.01)

(52) U.S. Cl.
CPC .................. *G06Q 10/087* (2013.01)

(58) Field of Classification Search
CPC .................................... G06Q 10/087
See application file for complete search history.

(56) References Cited

U.S. PATENT DOCUMENTS

| | | | |
|---|---|---|---|
| 9,043,434 B1 * | 5/2015 | Sadri | G06F 16/972 709/217 |
| 10,832,305 B1 * | 11/2020 | Woodbeck | G06F 16/5866 |
| 11,329,861 B2 | 5/2022 | Busbee et al. | |
| 11,379,490 B2 | 7/2022 | Zimmerman | |
| 11,385,775 B2 | 7/2022 | Singh et al. | |

* cited by examiner

*Primary Examiner* — A. Hunter Wilder
(74) *Attorney, Agent, or Firm* — Banner & Witcoff, Ltd.

(57) ABSTRACT

Systems as described herein may include website data surfacing. A data surfacing system may provide user interaction information to a machine learning model as input. Based on output from the machine learning model, the system may determine a likelihood that the user would navigate away from a website. After determining that the likelihood exceeds a threshold value and before the user navigates away from the website, the system may determine a second product in an inventory list that is similar to the first product on the website that is out of stock using a second machine learning model. Accordingly, the system may cause display of the second product in an overlay window displayed in the website using a browser extension on a user device.

20 Claims, 6 Drawing Sheets

WEBSITE DATA SURFACING

FIELD OF USE

Aspects of the disclosure relate generally to big data and more specifically to the processing and management of shared data among websites.

BACKGROUND

A remote server in a computing network may process data, including user browser data generated from user devices, to facilitate decision-making processes. For example, a user may interact with a browser, a browser extension or other mechanisms installed on a user device to access information on certain websites related to an interaction entity (e.g., a merchant) providing a service or a product. Sometimes the service or product may be displayed as out of stock on the websites. If the user navigates away from the websites without making a purchase, the opportunity to procure the product or service from alternative interaction entities or websites may be lost. As a result, a conventional server might not seize an optimal moment to gauge the user's interest before she leaves the website and thereby limit its ability to process user interaction data in real time and offer insights to support the decision-making processes.

Aspects described herein may address these and other problems, and generally improve the quality, efficiency, and speed of processing user interaction data to surface product or service from alternative websites while user's interest is sustained.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems as described herein may include features for website data surfacing. An electronic data surfacing system may compile an inventory list for a plurality of websites including a first website and a second website. The system may detect, using a browser extension or other mechanisms (e.g., Application Programming Interfaces (APIs), cookies, front end or server end code, integrations with Content Management System (CMS), applications on ecommerce platforms) on a user device, user interaction information comprising a cursor selecting a first product that may be out of stock at the first website. The system may use the browser extension or other mechanisms to collect product information associated with one or more attributes of the first product displayed in the first website. The system may determine that the first product is in the inventory list based on the product information. The system may provide the user interaction information as input to a first machine learning model. Based on output from the first machine learning model, the system may determine a likelihood that the user would navigate away from the first website. If the likelihood does not exceed a threshold value, the system may monitor further user interaction information associated with the first product displayed in the first website, and provide the further user interaction information as input to the first machine learning model. Based on output from the first machine learning model, the likelihood that the user would navigate away from the first website may be updated. After determining that the likelihood exceeds a threshold value and before the user navigates away from the first website, the system may determine a second product in the inventory list that is similar to the first product using a second machine learning model. The second product may be in stock at the second website. Accordingly, the system may cause display of the second product in an overlay window, and the overlay window may be displayed in the first website using the browser extension or other mechanisms on the user device.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
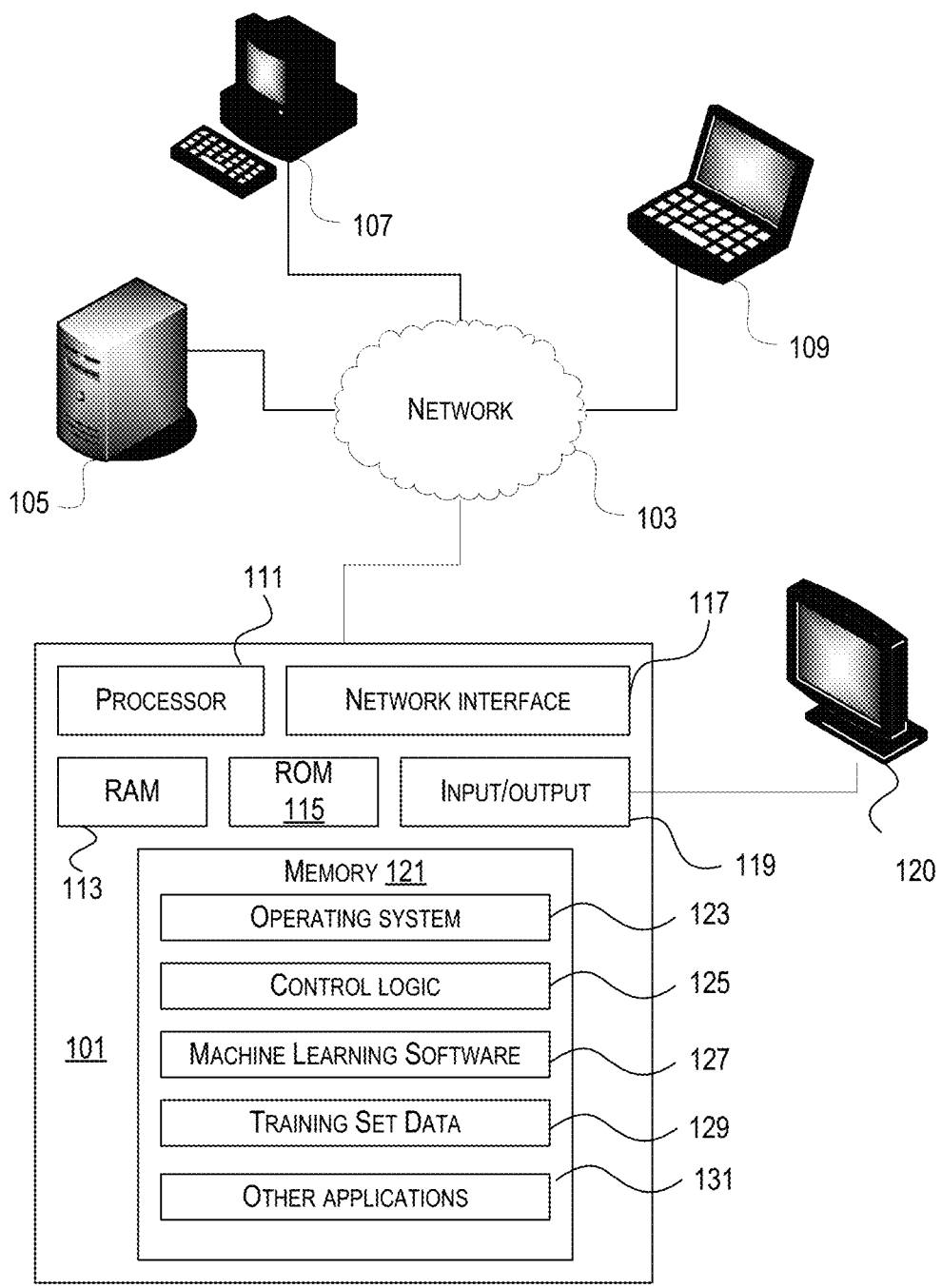
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects described herein may relate to website data surfacing. An electronic data surfacing system may compile an inventory list for a plurality of websites including a first website and a second website. The websites may display various products or services procured by interaction entities. The system may detect user interaction information using a browser extension or other mechanisms installed on a user device. The user interaction may include operations such as a cursor selection of a first product that may be out of stock at the first website. The user interaction may include operations such as a cursor movement towards a back button or a close button on the first website. The user interaction may include operations such as placing the first product into a shopping cart, or navigating to a different browser tab in the first website. The system may use the browser extension or other mechanisms to collect product information associated with one or more attributes of the first product displayed in the first website. The system may determine that the first product is in the inventory list based on the product information. The system may provide the user interaction information as input to a first machine learning model and receive output from the first machine learning model. Based on the output, the system may determine a likelihood that the user would navigate away from the first website. If the likelihood does not exceed a threshold value, the system may monitor further user interaction information associated with the first product displayed in the first website, and provide the further user interaction information as input to the first machine learning model. Based on output from the first machine learning model, the likelihood that the user would navigate away from the first website may be updated. The system may go through several iterations until the likelihood exceeds a threshold value. After determining that the likelihood exceeds the threshold value and before the user navigates away from the first website, the system may determine a second product in the inventory list that is similar to the first product using a second machine learning model, and the second product may be in stock at the second website. For example, the second product may be the same as the first product. The second product may be similar to the first product based on a color variation, a model variation or a variation in interaction entities that provide the first product and the second product. Accordingly, the system may cause display of the second product in an overlay window at the first website using the browser extension or other mechanisms on the user device.

In many aspects, the system may receive an indication from the user device of a user purchase of the second product in the overlay window. The system may assign a first commission to a first interaction entity associated with the first website. The system may assign a second commission to a second interaction entity associated with the second website.

In many aspects, the system may train the first machine learning model to determine user intent based on first training data. The first training data may include a time period indicating user interaction with one or more products on a training website. The first training data may include information indicating whether a training user added the one or more products into a cart on the training website, information indicating prior websites that the training user visited before arriving at the training website, or information indicating whether the training user visited the training website in the past. The first training data may include search terms used by the training user on the training website, or search results presented to the training user on the training website. The first training data may include a location of the training user, an age of the training user, or an IP address of the training user.

In many aspects, the system may train the second machine learning model to determine a similar product based on second training data. The second training data may include a product category associated with a training product, a price range of the training product or a color of the training product. The system may receive, from the user device, an indication of a user purchase of the second product in the overlay window. The system may present, to the user device, one or more products complementary to the second product in the overlay window.

The electronic data surfacing system may differ from conventional data processing systems at least because it captures and processes information on user interaction with a website from the browser extension or other mechanisms. The present system is significantly more than merely randomly collecting user interaction information: rather, the present system may analyze the user interaction information to gauge the user interest at an optimal time right before the user is about to navigate away from a website. The present system may determine a product that is similar to the product that is displayed at the website as out of stock. The present system may use a machine learning model to determine a likelihood that the user would navigate away from the website based on the user interaction information.

Aspects described herein improve the functioning of computers by improving the accuracy, relevancy and performance of computer-implemented data sharing processes. The steps described herein recite improvements to computer-implemented data surfacing processes, and in particular improve the accuracy and utility of user interaction information with website elements. This is a problem specific to computer-implemented data surfacing processes, and the processes described herein could not be performed in the human mind (and/or, e.g., with pen and paper). For example, as will be described in further detail below, the processes described herein rely on the use of browser extension and websites, the processing of user interaction information with the website elements, and the use of various machine learning models.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, and training set data 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, computing devices 101, 105, 107, 109, and others may operate in concert to provide parallel computing features in support of the operation of control logic 125 and/or machine learning software 127.

Figure 2:
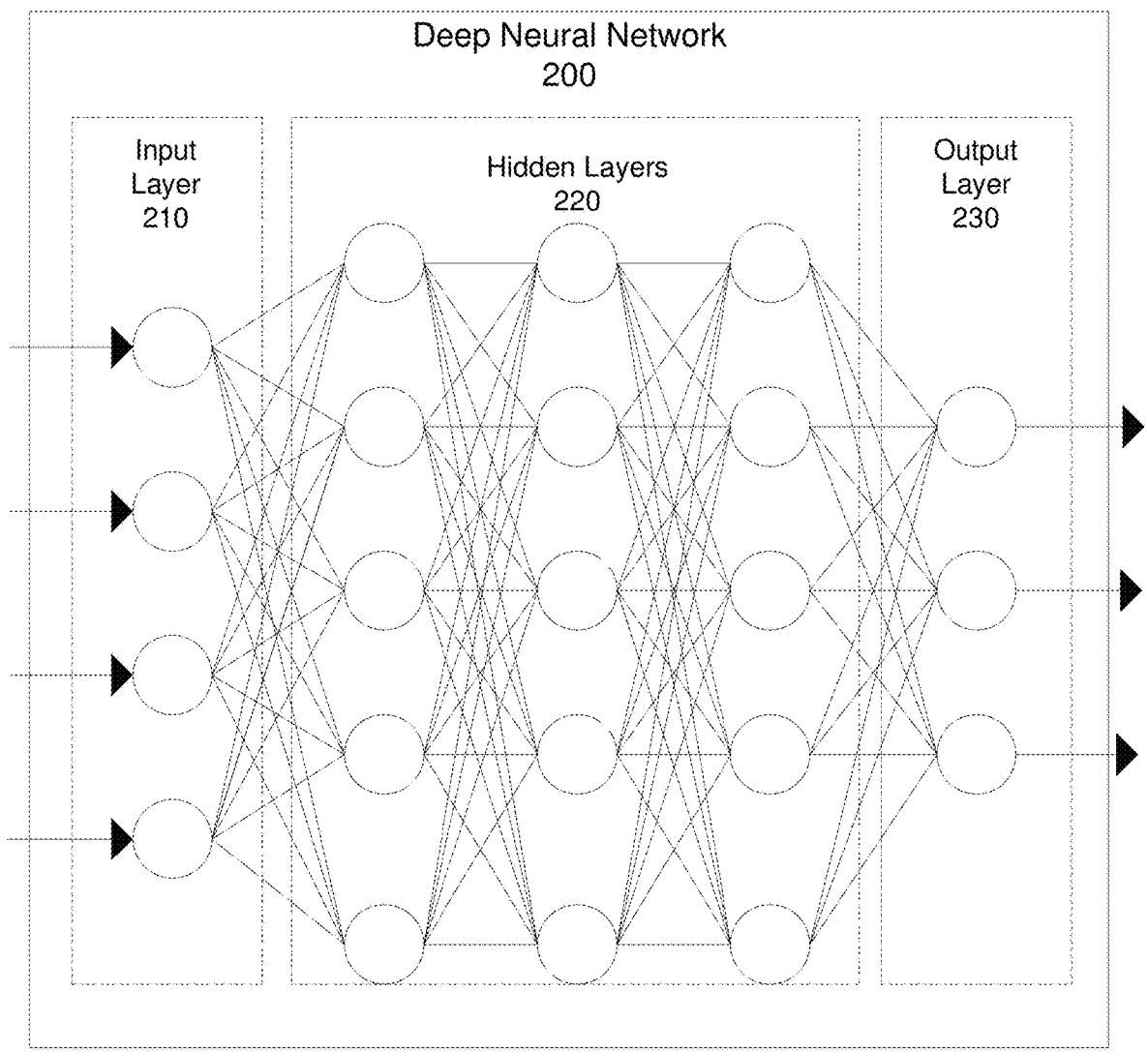
FIG. 2 depicts an example of deep neural network architecture for a model according to one or more aspects of the disclosure.

FIG. 2 illustrates an example deep neural network architecture 200. Such a deep neural network architecture might be all or portions of the machine learning software 127 shown in FIG. 1. That said, the architecture depicted in FIG. 2 need not be performed on a single computing device, and might be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
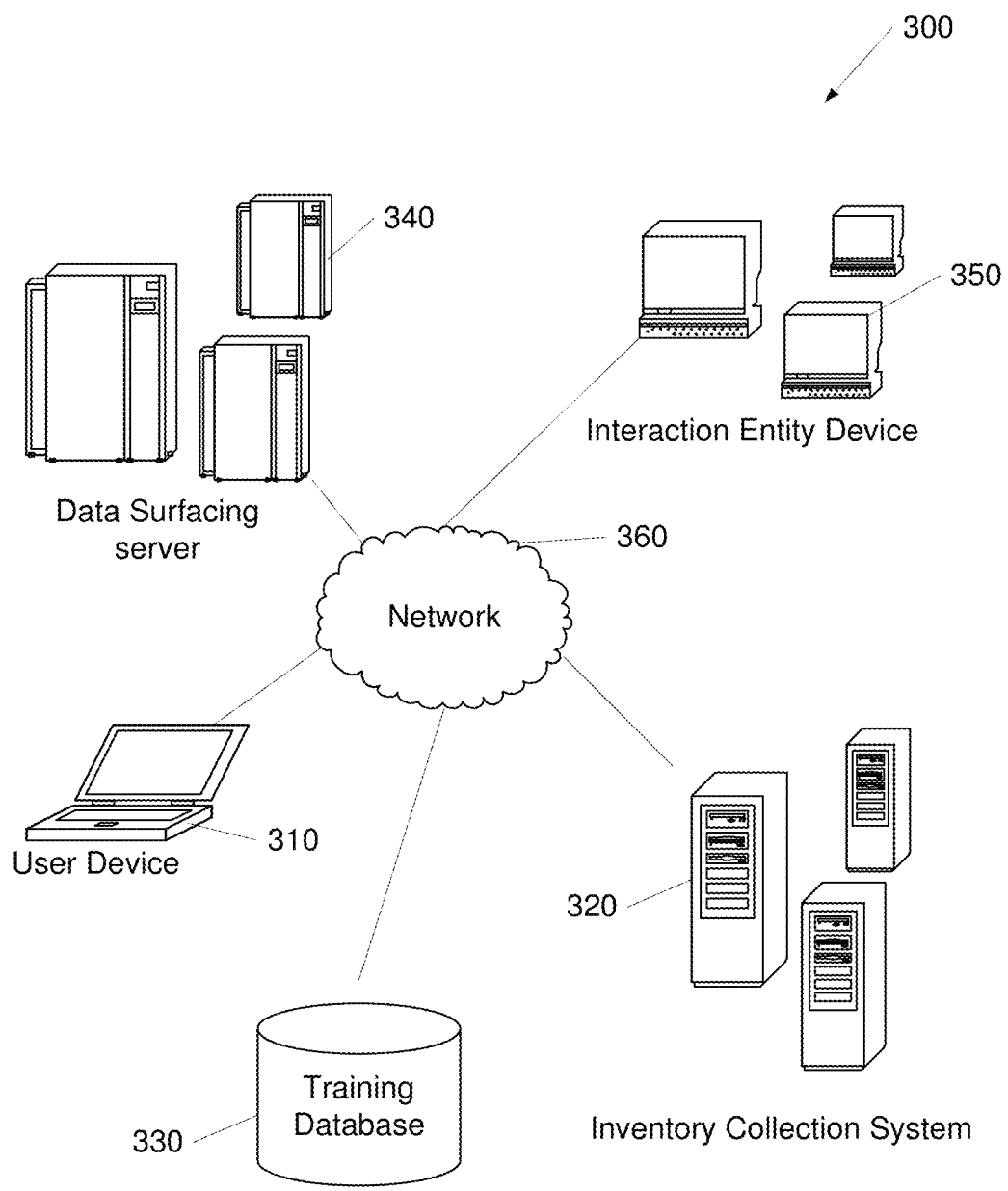
FIG. 3 shows an example of a system for website data surfacing in which one or more aspects described herein may be implemented.

FIG. 3 depicts a system 300 for website data surfacing. The electronic data surfacing system 300 may include at least one user device 310, at least one inventory collection system 320, at least one training database 330, at least one data surfacing server 340, and/or at least one interaction entity device 350 in communication via a network 360. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 1.

User devices 310 may execute a browser extension and use the browser extension to monitor user interaction with various website elements. User devices 310 may also use other mechanisms (e.g., Application Programming Interfaces (APIs), cookies, front end or server end code, integrations with Content Management System (CMS), applications on ecommerce platforms) to monitor user interaction with various website elements. The website elements may be related to one or more products or services displayed in the website. User device 310 may send user interaction information, and/or receive notification on alternative products as described herein. Inventory collection system 320 may collect, parse, and/or store inventory information related to various service or products provided by interaction entities (e.g., merchant devices or service provider devices) as described herein. For example, the inventory information may include product identification, interaction entity identification, inventory availability, and/or price information. Inventory collection system 320 may access public information or websites to generate an inventory list of products and services. Alternatively and/or additionally, various interaction entities may establish a collaborative organization and share their inventory information among the members of the organization. Inventor collection system 320 may compile a master inventory list to track the products and services provided by the members of the organization.

Training database 330 may receive, store and provide training data to train different machine learning models. Training database 330 may store a set of training data to train a machine learning model to determine a likelihood that the user would navigate away from a website. The training data may indicate a pattern of user actions that may lead to the user leaving the website. For example, the training data may include a time period indicating user interaction with one or more products on a training website. The training data may include information indicating whether a training user added the one or more products into a cart on the training website, information indicating prior websites that the training user visited before arriving at the training website, or information indicating whether the training user visited the training website in the past. The training data may include search terms used by the training user on the training website, or search results presented to the training user on the training website. The training data may include a location of the training user, an age of the training user or an IP address of the training user.

Training database 330 may store a set of training data to train a machine learning model to determine an alternative product that may be similar to a product displayed in the website. The training data may include logos, images, identification or description of the product, interaction entity identification or category code, inventory availability and/or price information from training products. The training data may include pre-labeled products that are similar or non-similar.

Data surfacing server 340 or inventory collection system 320 may compile an inventory list for a plurality of websites. Data surfacing server 340 may receive user interaction information from a browser extension or other mechanisms installed user device 310. The user interaction information may indicate how much time that the user spent looking at a particular product, whether the user added the product to a cart, whether the user reached for the close button, whether the user pressed the back button to leave the website, whether the user moved to a different browser tab, or how quickly the user took actions (e.g., to add the product to the cart, to reach for the close button, to press the back button, or to move to a different browser tab) after the user arrived at the website. The user interaction information may indicate navigation history such as whether the user visited the first website in the past, the websites that the user visited prior to arriving at the first website, or the type of the prior websites (e.g., a paid website, a social network website, a website related to organic product, or a content website) before the user arrived at the first website. The user interaction information may include search terms that the user used on the first website or other websites. The user interaction information may include user attributes such as a location, an IP address or an age of the user.

Data surfacing server 340 may detect a user selection of a first product that is out of stock at the first website based on the user interaction information. Data surfacing server 340 may use the browser extension or other mechanisms to collect product information of the first product displayed in the first website, such as the product category, the price, the color, the variations, or other product attributes. Data surfacing server 340 may also determine that the first product is displayed as out of stock on the first website. Based on the product information, data surfacing server 340 may determine that the first product is in the inventory list. For example, the first website may be associated with an interaction entity that may be a member of the collaborative organization. The interaction entity may have registered the products on the first website in the inventory list.

Data surfacing server 340 may provide the user interaction information as input to a first machine learning model. Based on output from the first machine learning model, data surfacing server 340 may determine a likelihood that the user would navigate away from the first website. The first machine learning model may be trained using training data across various websites and different users. The first machine learning model may be a supervised machine learning model and may be trained based on user feedback. The trained first learning model may identify a pattern of user interactions or user attributes that may lead to the user leaving the first website. The likelihood may reflect the possibility that the user's next move may be exiting the first website. Data surfacing server 340 may determine the likelihood in real time while the user is interacting with the first website.

Data surfacing server 340 may determine that the likelihood that the user would navigate away from the first website does not exceed a threshold value. In this situation, data surfacing server 340 may monitor further user interaction information associated with the first product displayed in the first website. Data surfacing server 340 may provide the further user interaction information as input to the first machine learning model. Based on output from the first machine learning model, data surfacing server 340 may update the likelihood that the user would navigate away from the first website. Data surfacing server 340 may go through several iterations until it determines that the likelihood exceeds the threshold value.

Data surfacing server 340 may use a second machine learning model to determine a second product in the inventory list that is similar to the first product displayed in the first website, and the second product is in stock at the second website. The second product may be the same as the first product. The second product may have a color variation or a model variation from the first product. The second product may have a variation in the interaction entities that provide the first product and the second product. The first and second products may belong to the same product category (e.g., consumer electronics, gardening tools, luggage and bags). The first and second products may be products complimentary to each other.

After determining that the likelihood exceeds the threshold value, data surfacing server 340 may present the second product to the user device prior to the user navigating away from the first website. Data surfacing server 340 may use the browser extension or other mechanisms on the user device and display the second product in an overlay window in the first website. The overlay window may be presented to the user device in the manner so that the first website may host the overlay window and the user traffic might not be directed to the second website. The overlay window might not display identification information of the second website. Instead, the overlay window may display a branding or identification information of the first website or the collaborative network or organization in which the first and second interaction entities are the members. Data surfacing server 340 may receive an indication of a user purchase of the second product in the overlay window from the user device. Data surfacing server 340 may assign a first commission to a first interaction entity associated with the first website and a second commission to a second interaction entity associated with the second website.

Interaction entity device 350 may be a device that hosts a website that provides a product or a service to the users. Interaction entity device 350 may be a member of a collaboration organization that shares inventory information among its members. The interaction entities may share an inventory collection system 320. Data sharing server 340 may communicate with interaction entity device 350 and retrieve product information. Based on the product information, data sharing server 340 may use the second machine learning model to determine similar products. After the user purchasing of a product is complete, data sharing server 340 may send the commission to interaction entity device 350.

User device 310, inventory collection system 320, training database 330, data surfacing server 340, and/or interaction entity device 350 may be associated with a particular authentication session. Data surfacing server 340 may receive user operation information and inventory information, process the user operation information, and/or share inventory and product information with user devices or interaction entity devices as described herein. However, it should be noted that any device in the electronic data surfacing system 300 may perform any of the processes and/or store any data as described herein. Some or all of the data described herein may be stored using one or more databases. Databases may include, but are not limited to, relational databases, hierarchical databases, distributed databases, in-memory databases, flat file databases, XML databases, NoSQL databases, graph databases, and/or a combination thereof. The network 360 may include a local area network (LAN), a wide area network (WAN), a wireless telecommunications network, and/or any other communication network or combination thereof.

The data transferred to and from various computing devices in electronic data surfacing system 300 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the electronic data surfacing system 300. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the electronic data surfacing system 300 in front of one or more computing devices such that any external devices may communicate directly with the specialized hardware.

Figure 4:
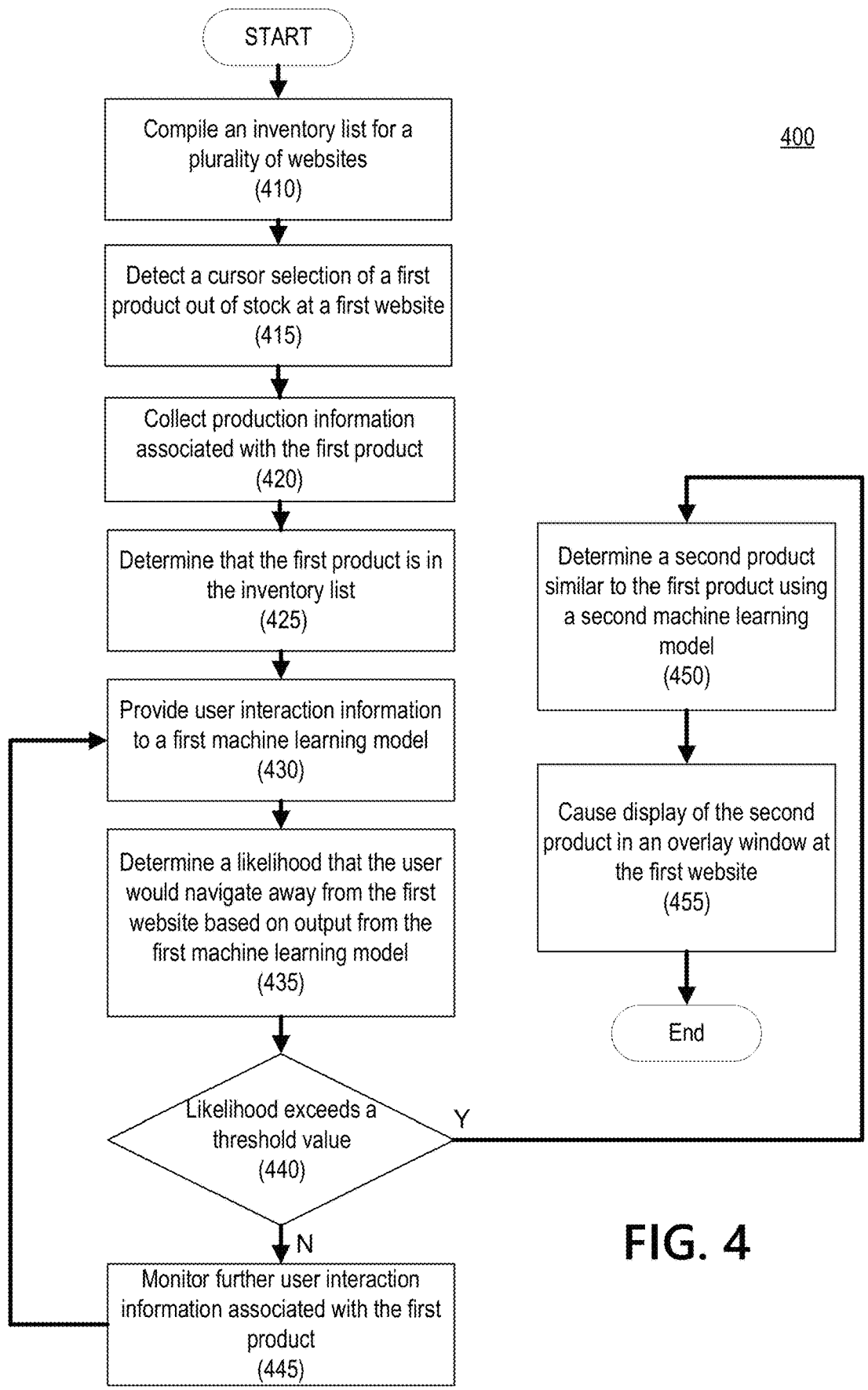
FIG. 4 shows a flow chart of a process for website data surfacing according to one or more aspects of the disclosure.

The electronic data surfacing systems may collect and process user interaction information generated from the browser extension or other mechanisms. The user interactions with various products, services and websites as reflected in the user interaction information may be processed to identify product that is out of stock and surface an alternative and similar product before the user navigates away. As such, the user operation information may be used to gauge user interest at an optimal time window right before the user is about to navigate away. FIG. 4 shows a flow chart of a process for data surfacing among websites according to one or more aspects of the disclosure. Some or all of the steps of process 400 may be performed using one or more computing devices as described herein.

At step 410, a data surfacing server (e.g., data surfacing server 340) may compile an inventory list for a plurality of website. The inventory list may include inventory information such as product identification, interaction entity identification, inventory availability and/or price information. The data surfacing server may use an inventory collection system to access public information or websites to generate the inventory list of available products and services. Various interaction entities may establish a collaborative organization and share their inventory information among the members of the organization. The data surfacing server may compile the inventory list to track the products and services provided by the members of the organization. The data surfacing server may maintain a database storing the inventory list and update the inventory list in the database as new member joins the collaborative organization or new product of an existing member becomes available. The inventory list may include products or services from various interaction entities, including the owners of a first website and a second website.

At step 415, the data surfacing server may detect a cursor selection of a first product that is displayed as out of stock at the first website. The Data surfacing server may receive user interaction information from a browser extension or other mechanisms installed on a user device as user navigates through various websites. The other mechanisms installed on the user device may include APIs, cookies, front end or server end code, integrations with CMS, applications on ecommerce platforms, and the like. For example, the browser extension or other mechanisms may monitor user interaction with a first website as the user opens the first website identified by a Universal Resource Link (URL). The user may perform various operations on the first website to interact with elements of the first website. For example, the user may move the cursor to certain products displayed on the website. The browser extension or other mechanisms may collect user interaction information indicating how much time that the user spent looking at a particular product, whether the user added the product to a cart, whether the user reached for the close button, whether the user pressed the back button to leave the website, whether the user moved to a different browser tab, or how quickly the user took actions (e.g., to add the product to the cart, to reach for the close button, to press the back button, or to move to a different browser tab) after the user arrived at the website. For example, the user may navigate to several websites before arriving at the first website. The browser extension or other mechanisms may collect user interaction information including navigation history such as whether the user visited the first website in the past, the websites that the user visited prior to arriving at the first website, or the type of the prior websites (e.g., a paid website, a social network website, a website related to organic product, or a content website) before the user arrived at the first website. For example, the user may enter search terms in the search window to search for one or more products. The browser extension or other mechanisms may collect user interaction information including search terms that the user used on the first website or other websites. For example, the user may be associated with a location, or a certain age. The browser extension or other mechanisms may collect user interaction information including user attributes such as a location, an IP address or an age of the user. The browser extension or other mechanisms may send the collected user interaction information to the data surfacing server. Based on the user interaction information, the data surfacing server may detect that the user moves the cursor to a first product displayed on the first website and select the first product to view the product details. The data surfacing server may also identify that the first product is out of stock at the first website, based on the product availability information received in the user interaction information.

The data surfacing server may receive the user interaction information as unstructured data format, such as a string of characters in a text format. The string of characters may be converted into a common format, such as a JSON format or an XML format. The data surfacing server may receive and process the user interaction information in a data stream on the fly. The data sharing server may receive and process the user interaction information in batch manner. For example, the user interaction information may be received periodically, such as once per minute or once per 10 seconds. The user interaction information in the text format may be pre-processed, perform a random sampling to take chunks of text to look for similarities among different batches to eliminate duplicated data. The user interaction information may be generated after a verification of non-duplicated data to produce a light weight data payload.

At step 420, the data surfacing server may collect product information associated with the first product. The product information may include the product category, the price, the color, the description, the interaction entity providing the product or other product attributes. The product information may include availability information. For example, if the first product is displayed as out of stock or a pre-ordered product at the first website, the availability information may be set as "not available" or "available in two weeks." The product information may be collected and processed to generate a light weight data load using the similar technique as described in step 415. The user interaction information may include the product information. In some examples, data surfacing server may use natural language processing (NPL) or optical character recognition (OCR) to parse the product information such as description of the products displayed on the first website to identify the keywords. Data surfacing server may remove certain stop words that do not add much meaning to the description, such as at, the, is, which, etc. For example, after processing the user interaction information, the product information may include key words such as, "product_identifier," "JackSport," "backpack," "SuperBreak," "blue," "$49.99," "⅔ padded back panel," "front utility pocket," "organizer," "web haul handle" or "out of stock."

At step 425, the data surfacing server may determine that the first product is in the inventory list. For example, the data surfacing server may search the inventory list in the database based on the "product_identifier." The product identifier may match with an identifier of a product in a record of the database. The match may indicate that the first product is in the inventory list shared among the members of the collaborative organization. Alternatively and/or additionally, the data surfacing server may search the inventory list using other key words such as "JackSport," "backpack," "SuperBreak," etc. The data surfacing server may determine if a record in the inventory list matches with these key words. Alternatively and/or additionally, the data surfacing server may search the inventory list using a logo or image of the first product. If the corresponding record is found in the inventory list, the data surfacing server may proceed to step 430. Otherwise, the data surfacing server may add a new record corresponding to the first product to the inventory list.

At step 430 the data surfacing server may provide the user interaction information as input to a first machine learning model. The data sharing server may use the first machine learning model to determine user intent based on the user interaction information. The user intent may indicate whether the user intents to navigate away from the first website. Optionally, instead of using the first machine learning to determine user intent, the data surfacing server may use a rule-based mechanism based on user interactions. For example, if the user moves the cursor close to the close button, or if the user deletes a product from the cart, the data surfacing server may consider these operations as indication that the user may navigate away from the first website in the next action. Accordingly, the data surfacing server may present an overlay window to display similar product as described in step 455.

At step 435, based on output from the first machine learning model, the data surfacing server may determine a likelihood that the user would navigate away from the first website. The first machine learning model may be trained using training data across various websites and different users. The first machine learning model may be a supervised machine learning model and may be trained based on user feedback. The trained first leaning model may identify a pattern of user interactions or user attributes that may lead to the user leaving the first website. The likelihood may reflect the possibility that the user's next move may be exiting the first website. The data surfacing server may determine the likelihood in real time while the user is interacting with the first website.

The machine learning model may be trained based on training data retrieved from a training database or websites obtained from public sources. The training data may include information related to user interactions with the training websites and the user interactions may be prelabeled with positive labels or negative labels leading to navigating away from the corresponding training websites. The positive labels may be related to training data indicating a pattern of user actions that may lead to the user leaving the website. For example, the training data may include a time period indicating user interaction with one or more products on a training website. The training data may include information indicating whether a training user adds the one or more products into a cart on the training website, information indicating prior websites that the training user visited before arriving at the training website, or information indicating whether the training user visited the training website in the past. The training data may include search terms used by the training user on the training website, or search results presented to the training user on the training website. The training data may include a location of the training user, an age of the training user, or an IP address of the training user.

During the model training process, the weights of each connection and/or node may be adjusted as the model adapts to generate more accurate predictions on a training set. The weights assigned to each connection and/or node may be referred to as the model parameters. For example, the data surfacing server may use a deep learning model and the model may be initialized with a first set of model parameters. The machine learning model may use the training data as input based on the first set of model parameter and determine the user intent with a first confidence level. The data surfacing server may generate a second set of model parameters based on the adjustment on the first set of model parameters. The first machine learning model may use the training data as input based on the second set of model parameter and determine the user intent with a second confidence level. Based on a comparison between the first confidence level and the second confidence level, data surfacing server may determine a more optimal set of parameters between the first set of model parameters and the second set of model parameters. The data surfacing server may go through several iterations, and the machine learning model may be tuned with a set of optimal model parameters when the confidence level reaches a predetermined threshold (e.g., 95%).

The data sharing server may use the tuned or trained machine learning model to determine the user intent based on the user interaction information collected from the first website. Based on the user interaction information, the data surfacing server may receive, as output from the trained first machine learning model, a likelihood that user would navigate away from the first website. For example, the first machine learning model may output that there is 70% possibility that the user may navigate away from the first website.

At step 440, the data surfacing server may determine whether the likelihood exceeds a threshold value. The data surfacing server may compare the likelihood with a predetermined value (e.g., 85%). If the likelihood does not exceed the threshold value, the process may proceed to step 445, where the data surfacing server may monitor further user interaction information associated with the first product. Subsequently, the process may proceed to step 430, where the further user interaction information may be provided as input to the first machine learning model, and at step 435, the likelihood may be updated by the output of the first machine learning model and based on the further user interaction information. As such, the likelihood may be updated dynamically as user interacts with the first website and further user interaction information becomes available as input to the first machine learning model. The data surfacing server may go through several iterations until it determines that the likelihood exceeds the threshold value.

At step 440, optionally (e.g., if the likelihood exceeds the threshold value), the process may proceed to step 450. At step 450, the data surfacing server may determine a second product similar to the first product using a second machine learning model based on the product information of the first product. The machine learning model may be the same or different from the first machine learning model used at steps 430 and 435. The second product may be the same as or similar to the first product. Data surfacing server may convert the product information into text embeddings or image embeddings. For example, data surfacing server may use an autoencoder such as a variational autoencoder (VAE) to convert the descriptions of the first product. An autoencoder may be a type of artificial neural network used to learn efficient data codings in an unsupervised manner. The autoencoder may learn a representation (e.g. encoding) for a set of data for the purpose of dimensionality reduction by training the network to ignore signal "noise". The autoencoder may have a reconstructing side, where the autoencoder may generate, from the reduced encoding, a representation as close as possible to its original input. An embedding may be a compact representation of the original data. The data surfacing server may use language modeling and feature learning techniques in NLP where key words or phrases from the collection of the descriptions may be mapped to vectors of real numbers. For example, data surfacing server may process the product information to generate a record, which may include key words such as a product identifier, an image of the product, a price of the product, a color of the product, a model of the product, a make of the product, an interaction entity offering the product, a logo of the interaction entity, the availability and so on. The data surfacing server may convert the record into text embeddings or image embeddings corresponding to a vector of features based on these key words. For example, the record may include a first vector of features for the first product on the first website such as "JackSport," "backpack," "$59.99," "blue," "SuperBreak," "⅔ padded back panel," "front utility pocket," "organizer," "web haul handle," "JackSport US," "out of stock," and so on. The first vector may also include an image of the backpack and a logo of JackSport US.

The data surfacing server may determine the second product similar to the first product displayed in the first website. The data surfacing server may train the second machine learning model to recognize product similarity based on training data retrieved from the training database. The training data may be collected from training websites or retrieved from training database that are similar products offered within the collaborative organization. The training data may include pre-labeled similar products extracted from the plurality of training websites or training database. The training data may also include pre-labeled non-similar products extracted from the plurality of training websites and training database. For example, the training data may include a product category, a price range or a color of the training product.

The data sharing server may train a second the machine learning model based on the pre-labeled products. During the model training process, the model parameters may be tuned similarly to training process of the first machine learning model. The data surfacing server may use the tuned or trained second machine learning model to determine product similarities on the product information of the first product that is displayed as out of stock at the first website. Based on the product information, the data surfacing server may receive as output from the trained second machine learning model one or more similar products. These similar products may be in stock at one or more websites different from the first website. The interaction entities providing the similar products may be members of the collaborative organization different from the first interaction entity providing the first product at the first website. The data surfacing server may select the second product similar to the first product from the one or more similar products. For example, the second product may be a product that similar to the first product with a high confidence score (e.g., more than 98%). The second product may be in stock on a second website provided by a second interaction entity.

At step 455, the data surfacing server may cause display of the second product in an overlay window at the first website. The overlay window might not display the logo or identification information of the second website. The data surfacing server may provide options in the overlay window for the user to view the full product details and to checkout. The overlay window may display information indicating the second product is provided from a partner, rather than the first website. Alternatively and/or additionally, the data surfacing server may display the second product in a website that may have branding of the first website or first interaction entity providing the first product. Alternatively and/or additionally, the data surfacing server may display the second product in a website that may have branding of the collaborative organization that the first interaction entity and the second interaction entity are the members of the organization.

If the data surfacing server detects an indication that the user made a purchase of the second product via the overlay window or the website presenting the second product, the data surfacing server may assign a first commission (e.g., 10%) to the first interaction entity associated with the first website, and assign a second commission (e.g., 90%) to the second interaction entity providing the second product. The data surfacing server may present one or more complementary products to the second product in the overlay window or the website presenting the second product. For example, the complementary products may include products that were frequently bought together. A large interaction entities may have the ability to provide the complimentary in-house given that they may have a very large product selection. Small interaction entities may use the collaborative organization to sell these complementary products through partnership with the members in the organization. In some examples, the data surfacing server may display the complementary products in the overlay window even if the user is not planning to leave the first website or after the user left the first website. For example, if the user spent an adequate amount of time browsing a product or added the product into the cart, the data surfacing server may present the complementary products in a overlay window regardless the website that the user is currently browsing.

Figure 5A:
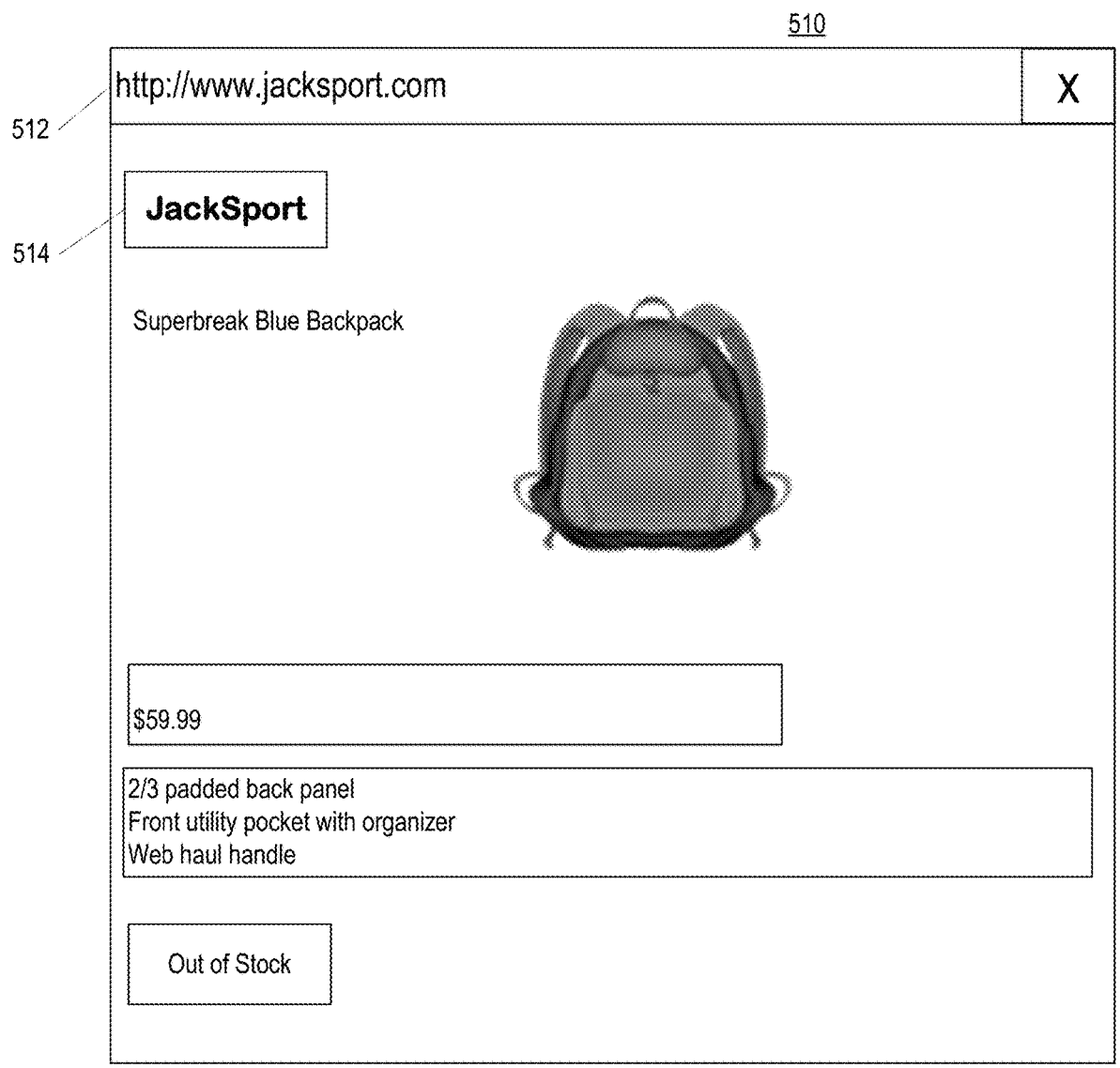
FIG. 5A shows a user interface displaying a website according to one or more aspects of the disclosure.
Figure 5B:
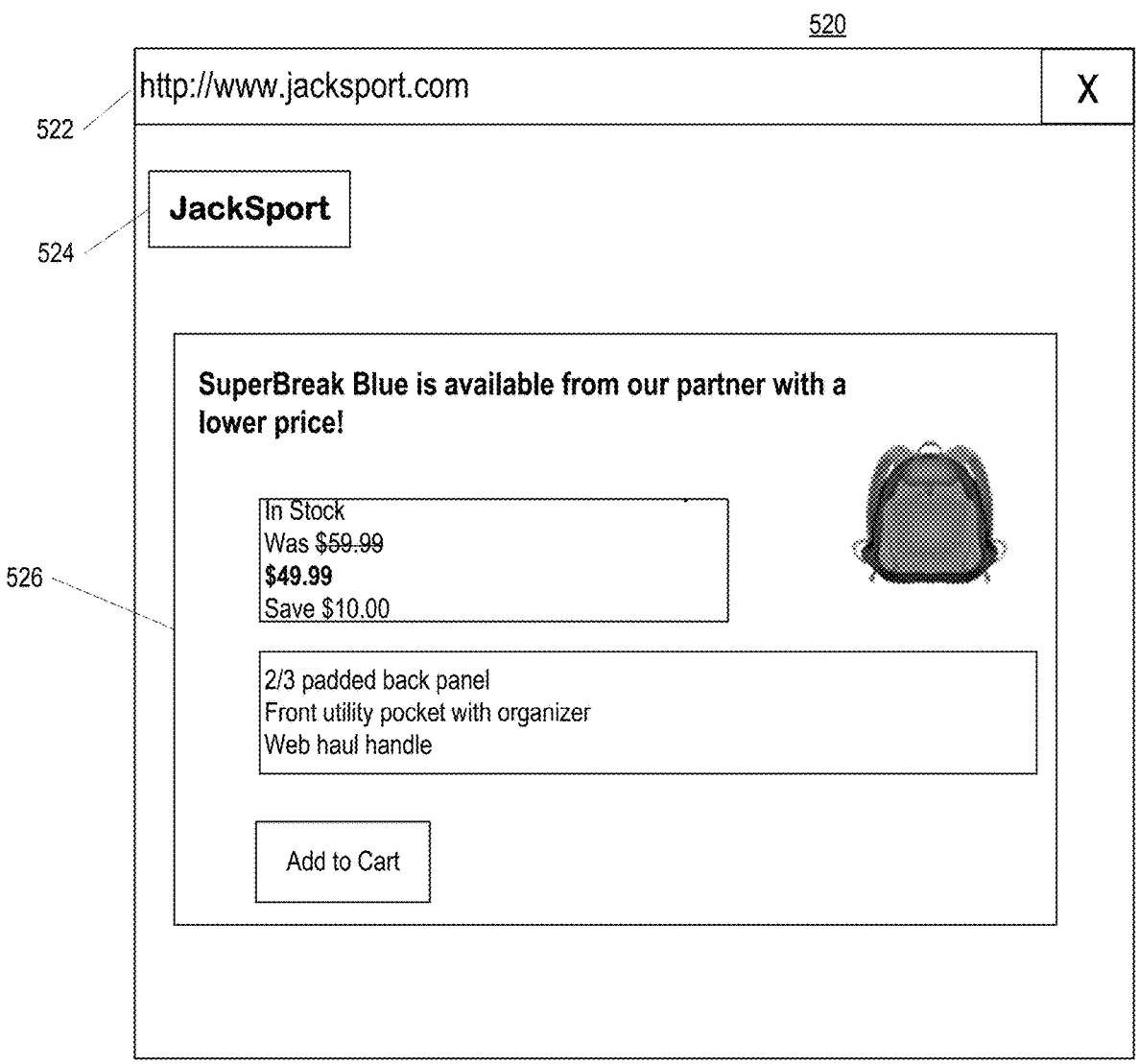
FIG. 5B shows an overlay window displayed in the website according to more aspects of the disclosure.

FIG. 5A-5B illustrate examples user interfaces for website data surfacing according to one or more aspects of the disclosure. The elements in FIGS. 5A-5B may be representations of various steps in method 400 depicted in FIG. 4, such as those depicted with respect to steps 415 and 455 of method 400. As illustrated in FIG. 5A, the user device may execute a browser window displaying a website with the URL 512 "www.jacksport.com" in user interface 510. The website related to interaction entity 514 JackSport may be displayed in the browser window. The JackSport website may display a product "JackSport SuperBreak blue backpack," an image of the product, a status "out of stock" or a price of the product $59.99. The JackSport website also displays product descriptions such as "⅔ padded back panel. Front utility pocket with organizer. Web haul handle." The JackSport website may correspond to the first website as discussed in FIG. 4. The JackSport website as shown in FIG. 5A may illustrate the situation that the user navigates to the JackSport website, the user browses various products on the website and the user spends some time looking at the detailed description of the SuperBreak backpack. The SuperBreak backpack may be displayed as out of stock on the JackSport website. In the next action, the user may be ready to navigate away from the JackSport website without making a purchase.

FIG. 5B shows another user interface displaying website data surfacing according to one or more aspects of the disclosure. As illustrated in FIG. 5B, just before the user is about to navigate away from the JackSport website, the data surfacing server may present an overlay window over the JackSport website. Instead of re-directing the user traffic to the website of a second interaction entity providing a second product that is the same as or similar to the SuperBreak backpack, the data surfacing server may use an overlay window to display the second product. While the user is browsing the JackSport website, an overlay window 526 may be displayed in the JackSport website so that the JackSport website may be partially or entirely (not shown in FIG. 5B) concealed from the user interface 520. The overlay window may display a message "SuperBreak blue is available from our partner with a lower price!" In the example of FIG. 5B, if the SuperBreak backpack is available for a partner with a reduced price, the overlay window may display the reduced price $49.99, and accordingly the product details. The overlay window may 526 also include a button for the user to add the product to the cart for purchase. If the user chooses to add the SuperBreak backpack to a cart in the overlay window 526 and complete the purchase, the overlay window 526 may terminate from user interface 520. The user may be returned to the JackSport website so that the JackSport website might not lose any potential future sale. The data surfacing server may assign a first commission to the JackSport website and a second commission to the partner website.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
   compiling, using a database, an inventory list for a plurality of websites comprising a first website and a second website;
   detecting, using a browser extension on a user device associated with a user, user interaction information comprising a cursor selecting a first product out of stock at the first website;

collecting, using the browser extension on the user device, product information associated with one or more attributes of the first product displayed in the first website;
determining, based on the product information, that the first product is in the inventory list;
providing, as input to a first machine learning model, the user interaction information;
determining, based on output from the first machine learning model, a likelihood that the user would navigate away from the first website;
after determining that the likelihood does not exceed a threshold value:
  monitoring further user interaction information associated the first product displayed in the first website;
  providing, as input to the first machine learning model, the further user interaction information; and
  updating, based on output from the first machine learning model, the likelihood that the user would navigate away from the first website; and
after determining that the likelihood exceeds the threshold value and before the user navigates away from the first website:
  processing the product information to generate a record comprising a plurality of key words;
  converting, based on the key words, the record into text embeddings or image embeddings corresponding to a vector of features;
  determining, using a second machine learning model and based on the vector of features, a second product in the inventory list that is similar to the first product displayed in the first website, wherein the second product is in stock at the second website; and
  causing, using the browser extension on the user device, display of the second product in an overlay window displayed in the first website.

2. The computer-implemented method of claim 1, wherein the user interaction information further comprises operations associated with:
  a cursor movement towards a back button or a close button on the first website;
  navigating to a different tab in the first website.

3. The computer-implemented method of claim 1, wherein determining the second product in the inventory list that is similar to the first product is based on at least one of:
  a color variation,
  a model variation; and
  a variation in entities that provide the first product and the second product.

4. The computer-implemented method of claim 1, further comprising:
  receiving, from the user device, an indication of a user purchase of the second product in the overlay window;
  assigning a first commission to a first interaction entity associated with the first website; and
  assigning a second commission to a second interaction entity associated with the second website.

5. The computer-implemented method of claim 1, further comprising:
  training the first machine learning model to determine user intent based on first training data comprising:
    a time period indicating user interaction with one or more products on a training website;
    first information indicating whether a training user adds the one or more products into a cart on the training website;
    second information indicating prior websites that the training user visited before arriving at the training website; and
    third information indicating whether the training user visited the training website in the past.

6. The computer-implemented method of claim 5, wherein the first training data further comprises:
  search terms used by the training user on the training website; and
  search results presented to the training user on the training website.

7. The computer-implemented method of claim 5, wherein the first training data further comprises user attributes comprising:
  a location of the training user;
  an age of the training user; and
  an IP address of the training user.

8. The computer-implemented method of claim 1, further comprising:
  training the second machine learning model to determine similar product based on second training data comprising:
    a product category associated with a training product;
    a price range of the training product; and
    a color of the training product.

9. The computer-implemented method of claim 1, further comprising:
  receiving, from the user device, an indication of a user purchase of the second product in the overlay window; and
  presenting, to the user device, one or more products complementary to the second product in the overlay window.

10. An electronic data sharing system comprising:
  one or more processors; and
  memory storing instructions that, when executed by the one or more processors, cause the electronic data sharing system to:
    compile, using a database, an inventory list for a plurality of websites comprising a first website and a second website;
    detect, using a browser extension on a user device associated with a user, user interaction information comprising a cursor selecting a first product out of stock at the first website;
    collect, using the browser extension on the user device, product information associated with one or more attributes of the first product displayed in the first website;
    determine, based on the product information, that the first product is in the inventory list;
    provide, as input to a first machine learning model, the user interaction information;
    determine, based on output from the first machine learning model, a likelihood that the user would navigate away from the first website;
    after determining that the likelihood exceeds a threshold value and before the user navigates away from the first website:
      process the product information to generate a record comprising a plurality of key words;
      convert, based on the key words, the record into text embeddings or image embeddings corresponding to a vector of features;
      determine, using a second machine learning model and based on the vector of features, a second product in the inventory list that is similar to the first product displayed in the first website, wherein the second product is in stock at the second website;
cause, using the browser extension on the user device, display of the second product in an overlay window displayed in the first website;
receive, from the user device, an indication of a user purchase of the second product in the overlay window;
assign a first commission to a first interaction entity associated with the first website; and
assign a second commission to a second interaction entity associated with the second website.

11. The electronic data sharing system of claim 10, wherein the user interaction information comprises operations associated with:
a cursor movement towards a back button or a close button on the first website;
navigating to a different tab in the first website.

12. The electronic data sharing system of claim 10, wherein the instructions cause the electronic data sharing system to:
determine the second product in the inventory list that is similar to the first product based on at least one of:
a color variation,
a model variation; and
a variation in entities that provide the first product and the second product.

13. The electronic data sharing system of claim 10, wherein the instructions cause the electronic data sharing system to:
train the first machine learning model to determine user intent based on first training data comprising:
a time period indicating user interaction with one or more products on a training website;
first information indicating whether a training user adds the one or more products into a cart on the training website;
second information indicating prior websites that the training user visited before arriving at the training website; and
third information indicating whether the training user visited the training website in the past.

14. The electronic data sharing system of claim 10, wherein the instructions cause the electronic data sharing system to:
train the second machine learning model to determine similar product based on second training data comprising:
a product category associated with a training product;
a price range of the training product; and
a color of the training product.

15. The electronic data sharing system of claim 10, wherein the instructions cause the electronic data sharing system to:
after receiving the indication of the user purchase of the second product, present, to the user device, one or more products complementary to the second product in the overlay window.

16. The electronic data sharing system of claim 10, wherein the instructions cause the electronic data sharing system to:
after determining that the likelihood does not exceed the threshold value, monitor further user interaction information associated the first product displayed in the first website;
provide, as input to the first machine learning model, the further user interaction information; and
determine, based on output from the first machine learning model, an updated likelihood that the user would navigate away from the first website.

17. One or more non-transitory media storing instructions that, when executed by one or more processors, cause the one or more processors to perform steps comprising:
compiling, using a database, an inventory list for a plurality of websites comprising a first website and a second website;
detecting, using a browser extension on a user device associated with a user, user interaction information comprising a cursor selecting a first product out of stock at the first website;
collecting, using the browser extension on the user device, product information associated with one or more attributes of the first product displayed in the first website;
determining, based on the product information, that the first product is in the inventory list;
providing, as input to a first machine learning model, the user interaction information;
determining, based on output from the first machine learning model, a likelihood that the user would navigate away from the first website; and
after determining that the likelihood exceeds a threshold value and before the user navigates away from the first website:
processing the product information to generate a record comprising a plurality of key words;
converting, based on the key words, the record into text embeddings or image embeddings corresponding to a vector of features;
determining, using a second machine learning model and based on the vector of features, a second product in the inventory list that is similar to the first product displayed in the first website, wherein the second product is in stock at the second website; and
causing, using the browser extension on the user device, display of the second product in an overlay window displayed in the first website.

18. The non-transitory media of claim 17, wherein the instructions when executed by the one or more processors, cause the one or more processors to further perform steps comprising:
training the first machine learning model to determine user intent based on first training data comprising:
a time period indicating user interaction with one or more products on a training website;
first information indicating whether a training user adds the one or more products into a cart on the training website;
second information indicating prior websites that the training user visited before arriving at the training website; and
third information indicating whether the training user visited the training website in the past.

19. The non-transitory media of claim 17, wherein the instructions when executed by the one or more processors, cause the one or more processors to further perform steps comprising:
training the second machine learning model to determine similar product based on second training data comprising:
a product category associated with a training product;
a price range of the training product; and
a color of the training product.

20. The non-transitory media of claim 17, wherein the instructions when executed by the one or more processors, cause the one or more processors to further perform steps comprising:
   after determining that the likelihood does not exceed the threshold value:
      monitoring further user interaction information associated the first product displayed in the first website;
      providing, as input to the first machine learning model, the further user interaction information; and
      updating, based on output from the first machine learning model, the likelihood that the user would navigate away from the first website.

\* \* \* \* \*